US012755998B2

(12) United States Patent
Heiredal-Clausen et al.

(10) Patent No.: US 12,755,998 B2
(45) Date of Patent: Oct. 6, 2026

(54) SOC STACK COMPRISING INTEGRATED INTERCONNECT AND SPACER

(71) Applicant: Topsoe A/S, Kgs. Lyngby (DK)

(72) Inventors: Thomas Heiredal-Clausen, Birkerød (DK); Jeppe Rass-Hansen, Copenhagen (DK); Tobias Holt Nørby, Glostrup (DK); Bengt Peter Gustav Blennow, Humlebæk (DK); Rainer Küngas, Peetri (EE); Martin Refslund Nielsen, Birkerød (DK)

(73) Assignee: Topsoe A/S, Kgs. Lyngby (DK)

( * ) Notice: Subject to any disclaimer, the term of this patent is extended or adjusted under 35 U.S.C. 154(b) by 1013 days.

(21) Appl. No.: 17/798,837

(22) PCT Filed: Feb. 15, 2021

(86) PCT No.: PCT/EP2021/053590

§ 371 (c)(1),
(2) Date: Aug. 10, 2022

(87) PCT Pub. No.: WO2021/165180

PCT Pub. Date: Aug. 26, 2021

(65) Prior Publication Data

US 2023/0093223 A1 Mar. 23, 2023

(30) Foreign Application Priority Data

Feb. 17, 2020 (EP) .................................... 20157590

(51) Int. Cl.
*H01M 8/1246* (2016.01)
*H01M 8/026* (2016.01)
(Continued)

(52) U.S. Cl.
CPC ......... *H01M 8/1246* (2013.01); *H01M 8/026* (2013.01); *H01M 8/0286* (2013.01); *H01M 8/2483* (2016.02); *H01M 2008/1293* (2013.01)

(58) Field of Classification Search
CPC ............. H01M 8/0206; H01M 8/0228; H01M 8/0232; H01M 8/0247; H01M 8/0254; H01M 8/026; H01M 8/0271
See application file for complete search history.

(56) References Cited

U.S. PATENT DOCUMENTS 6,492,053 B1 12/2002 Donelson et al.
9,455,453 B2 9/2016 Hotta et al.
(Continued)

FOREIGN PATENT DOCUMENTS

CN 101411021 A 4/2009
CN 103299466 A 9/2013
(Continued)

OTHER PUBLICATIONS

Bang, M., et al., "Flow and Pressure Distribution in Fuel Cell Manifolds," Journal of Fuel Cell Science and Technology, Dec 2010, 7 Article 061001, pp. 1-8 is directed toward fuel cells (p. 1: title). (Year: 2010).
(Continued)

*Primary Examiner* — Helen Oi K Conley
*Assistant Examiner* — Amanda Rosenbaum
(74) *Attorney, Agent, or Firm* — Blank Rome LLP

(57) ABSTRACT

A Solid Oxide Cell stack has an integrated interconnect and spacer, which is formed by bending a surplus part of the plate interconnect 180° to form a spacer part on top of the interconnect and connected to the interconnect at least by the bend.

20 Claims, 4 Drawing Sheets

(51) Int. Cl.

| | |
|---|---|
| ***H01M 8/0286*** | (2016.01) |
| ***H01M 8/12*** | (2016.01) |
| ***H01M 8/2483*** | (2016.01) |

(56) References Cited

U.S. PATENT DOCUMENTS

| | | | | |
|---|---|---|---|---|
| 10,505,321 | B2 | 12/2019 | Hood | |
| 10,581,106 | B2 | 3/2020 | Brown | |
| 2001/0028973 | A1 | 10/2001 | Ong | |
| 2003/0017377 | A1 | 1/2003 | Diez | |
| 2003/0064269 | A1 | 4/2003 | Kelly et al. | |
| 2004/0151975 | A1* | 8/2004 | Allen | H01M 8/0206 72/379.6 |
| 2005/0016729 | A1 | 1/2005 | Savage | |
| 2005/0147865 | A1* | 7/2005 | Diez | H01M 8/2483 429/456 |
| 2007/0231664 | A1 | 10/2007 | Zerfass et al. | |
| 2008/0107944 | A1* | 5/2008 | Goebel | H01M 8/0271 429/457 |
| 2009/0325037 | A1* | 12/2009 | Hood | H01M 8/0297 429/457 |
| 2010/0297535 | A1 | 11/2010 | Das et al. | |
| 2013/0130152 | A1 | 5/2013 | Couse et al. | |
| 2020/0212470 | A1 | 7/2020 | Baird et al. | |

FOREIGN PATENT DOCUMENTS

| | | | |
|---|---|---|---|
| CN | 107887623 | A | 4/2018 |
| EP | 1 298 755 | A2 | 4/2003 |
| EP | 2 953 197 | A1 | 12/2015 |
| JP | 2011249242 | A | 12/2011 |
| WO | 2007/085863 | A1 | 8/2007 |
| WO | WO 2010/012336 | A1 | 2/2010 |
| WO | WO 2013/156075 | A1 | 10/2013 |
| WO | 2014/017097 | A1 | 1/2014 |
| WO | WO 2019/034855 | A1 | 2/2019 |

OTHER PUBLICATIONS

Precision Micro Blog Post from 2018 published by Precision Micro. Accessed using Way Back Machine on storage date Dec. 1, 2020. https://web.archive.org/web/20201201173740/https://www.precisionmicro.com/ bipolar-plate-manufacture-why-fuel-cell-engineers-should-consider-photo-chemical-etching/). (Year: 2018), pp. 1-4.

Simoes, S., “Diffusion Bonding and Brazing of Advanced Materials,” Metals 2018, 8, Article 959, pp. 3, Discusses Joining Techniques for Metals (p. 1: title).

* cited by examiner

SOC STACK COMPRISING INTEGRATED INTERCONNECT AND SPACER

FIELD OF THE INVENTION

The invention relates to a Solid Oxide Cell (SOC) stack, in particular a Solid Oxide Electrolysis Cell (SOEC) stack or a Solid Oxide Fuel Cell (SOFC) stack, comprising an integrated interconnect and spacer, in particular an integrated interconnect and spacer made from a single component folded, sheet metal.

BACKGROUND OF THE INVENTION

In SOC stacks which has an operating temperature between 600° C. and 1000° C., preferably between 600° C. and 850° C., several cell units are assembled to form the stack and are linked together by interconnects. Interconnects serve as a gas barrier to separate the anode and cathode sides of adjacent cell units, and at the same time they enable current conduction between the adjacent cells, i.e. between an anode of one cell and a cathode of a neighbouring cell. Further, interconnects are normally provided with a plurality of flow paths for the passage of process gas on both sides of the interconnect. To optimize the performance of a SOC stack, a range of positive values should be maximized without unacceptable consequence on another range of related negative values which should be minimized. Some of these values are:

| VALUES TO BE MAXIMIZED | VALUES TO BE MINIMIZED |
|---|---|
| - Process gas utilization<br>- electrical efficiency<br>- lifetime | - Cost<br>- Dimensions<br>- production time<br>- fail rate<br>- number of components<br>- Parasitic loss (heating, cooling, blowers..)<br>- material use |

Almost all the above listed values are interrelated, which means that altering one value will impact other values. Some relations between the characteristics of process gas flow in the cells and the above values are mentioned here:

Process Gas Utilization:

The flow paths on the interconnect should be designed to seek an equal amount of process gas to each cell in a stack, i.e. there should be no flow-"short-cuts" through the stack.

Parasitic Loss:

Design of the process gas flow paths in the SOC stack and its cell units should seek to achieve a low pressure loss per flow volume, which will reduce the parasitic loss to blowers.

Electric Efficiency:

The interconnect leads current between the anode and the cathode layer of neighbouring cells. Hence, to reduce internal resistance, the electrically conducting contact points (hereafter merely called "contact points") of the interconnect should be designed to establish good electrical contact to the electrodes (anode and cathode) and the contact points should no where be far apart, which would force the current to run through a longer distance of the electrode with resulting higher internal resistance.

Lifetime:

It is desirable that the lifetime of an SOC stack is maximized, i.e. that in SOFC mode it can be used to produce as much electricity as possible and that in SOEC mode the amount of electrolysis product (e.g. $H_2$ and/or CO) is maximized. Stack lifetime depends on a number of factors, including the choice of the interconnect and spacer, on flow distribution on both process gas sides of the interconnect, evenly distributed protective coating on the materials, on the operating conditions (temperature, current density, voltage, etc), on cell design and materials and many other factors.

Cost:

The cost contribution of the interconnects (and spacers) can be reduced by not using noble materials, by reducing the production time of the interconnect and spacer, minimizing the number of components and by minimizing the material loss (the amount of material discarded during the production process).

Dimensions:

The overall dimensions of a fuel stack are reduced, when the interconnect design ensures a high utilization of the active cell area. Dead-areas with low process gas flow should be reduced and inactive zones for sealing surfaces should be minimized.

Production Time.

Production time of the interconnect and spacer itself should be minimized and the interconnect design should also contribute to a fast assembling of the entire stack. In general, for every component the interconnect design renders unnecessary, there is a gain in production time.

Fail Rate.

The interconnect and spacer production methods and materials should permit a low interconnect fail rate (such as unwanted holes in the interconnect gas barrier, uneven material thickness or characteristics). Further the fail-rate of the assembled cell stack can be reduced when the interconnect design reduces the total number of components to be assembled and reduces the length and number of seal surfaces.

Number of Components.

Apart from minimizing errors and assembling time as already mentioned, a reduction of the number of components leads to a reduced cost.

The way the anode and cathode gas flows are distributed in a SOC stack is by having a common manifold for each of the two process gasses. The manifolds can either be internal or external. The manifolds supply process gasses to the individual layers in the SOC stack by the means of channels to each layer. The channels are normally situated in one layer of the repeating elements which are comprised in the SOC stack, i.e. in the spacers or in the interconnect.

Interconnects and spacers which are made of sheet metal, are normally made of two separate parts of sheet material, which are sealed together in the SOC stack. This requires sealing between interconnect and spacer, plus handling of the separate components in the production. Furthermore, as the two separate sheet pieces often have the same outer dimensions, a lot of material, is wasted when most of the centre material of the spacer sheet is removed (e.g. stamped out).

U.S. Pat. No. 6,492,053 discloses a fuel cell stack including an interconnect and a spacer. Both, the interconnect and the spacer, have inlet and outlet manifolds for the flow of oxygen/fuel. The inlet and outlet manifolds have grooves/passages on its surface for the distribution of oxygen/fuel along the anode and cathode. However, the grooves/passages of the interconnect and spacer are not aligned with each other and hence their geometries could not be combined to achieve multiple inlet points. Also, since the grooves/passages are on the surface of both the interconnect and spacers, the formation of multiple inlet points are not feasible.

US2010297535 discloses a bipolar plate of a fuel cell with flow channels. The flow plate has multiple channels for distributing fluid uniformly between the active area of the fuel cell. The document does not describe a second layer and similar channels within it.

US2005016729 discloses a ceramic fuel cell(s) which is supported in a heat conductive interconnect plate, and a plurality of plates form a conductive heater named a stack. Connecting a plurality of stacks forms a stick of fuel cells. By connecting a plurality of sticks end to end, a string of fuel cells is formed. The length of the string can be one thousand feet or more, sized to penetrate an underground resource layer, for example of oil. A pre-heater brings the string to an operating temperature exceeding 700 DEG C., and then the fuel cells maintain that temperature via a plurality of conduits feeding the fuel cells fuel and an oxidant, and transferring exhaust gases to a planetary surface. A manifold can be used between the string and the planetary surface to continue the plurality of conduits and act as a heat exchanger between exhaust gases and oxidants/fuel.

None of the above described known art provides a simple, efficient and fail-safe solution to the above described problems.

Therefore, with reference to the above listed considerations, there is a need for a robust, simple, cheap and easy to produce and handle, multi-channel interconnect and spacer solution for a SOC stack.

These and other objects are achieved by the invention as described below.

SUMMARY OF THE INVENTION

The invention is to make a single component (which combines the functionalities of the interconnect and spacer) in sheet metal by folding the spacer part from the IC sheet onto the one side of the sheet metal. Folding (or bending) is a mass preserving process, hence there is no waste. The folding radius is dependent of the sheet thickness, when folding thin sheet material as in the present invention, very small folding radius can be obtained.

By folding the spacer from the interconnect sheet metal, several issues are solved:

- Reduction of sealing areas in the stack and thus fewer places where leak can occur, while saving a sealing layer per interconnect-spacer assembly.
- Reduction of components to be handled in production.
- As the spacer is made of the same sheet metal as the interconnect, the thickness of the interconnect and the spacer is the same, thus reducing tolerance issues in the stack assembly.
- When spacers are made from a separate sheet metal, the material use is greater as the sealing area normally located in the periphery of the interconnect. The folded solution thus saves material, as the folded part is included in the interconnect periphery, and the “internal” of the spacer is used for interconnect.
- Identical material of the interconnect and spacer (and no sealing material) yields same coefficient of thermal expansion.
- As the spacer is part of the interconnect, the alignment of a separate spacer part is eliminated.
- The folding process is cheap and industrial scalable.

To produce the integrated interconnect and spacer, the interconnect geometry is enlarged to include the spacers, which are then folded on top of the interconnect. The folding process is simple and robust and used in several industries (e.g. metal cans).

The thickness of the spacer is the same as the thickness of the interconnect. This reduces tolerances when assembling the stack. The same tolerances cannot be achieved by other processes, i.e. etching a seal between interconnect and spacer is saved. As the interconnect and spacer become one component, it saves on handling of components. As spacers are usually placed in the periphery of the interconnect, the centre is cut out and wasted using a standard solution. When the spacer is part of the interconnect, the internal of the spacer is not wasted, reducing material waste.

The invention according to claim 1 is a Solid Oxide Cell stack comprising a plurality of stacked cell units. Each of the cell units comprises a cell layer, with anode, cathode and electrolyte and an interconnect layer. The layers are stacked alternating so that one interconnect layer separates one cell layer from the adjacent cell layer in the cell stack. The interconnect layer comprises an integrated interconnect and spacer which is made from one piece of plate with the thickness T, instead of having a separate spacer as known in the art. The spacer is formed by bending at least a part of the edges of the interconnect 180° a number, N, of time to provide a spacer which covers at least a part of the edges of the interconnect. It is to be understood that the bend is 180° with the tolerances which are inherent and common for the production process of bending, which may also include some degree of flexing back. Also, it is to be understood that the piece of plate to be bent before bending has dimensions larger than the final integrated interconnect and spacer, where the surplus area is to be bent and will form the spacer after the bend. After bending, the spacer and interconnect together form an edge of at least a part of the integrated interconnect and spacer with a thickness equal to or less than (1+N) times the thickness of the plate T. It is to be understood that the thickness depends of material and production tolerances which may lead to measures slightly above and below the exact thickness equal to or less than (1+N) times the thickness of the plate T, which is therefore within the scope of the claim. It is however a part of the invention that the bending process may also provide a higher accuracy than known from common solid oxide cell stacks, since a gasket between spacer and interconnect is omitted and because the bending process may be followed by an accurate press which evens the thickness of the integrated interconnect and spacer to fine tolerances. It is to be understood that contact between the cells by the integrated interconnect and spacer is ensured both by the bent edges as well as by contact points throughout the surface of the integrated interconnect and spacer. The contact points may be provided by a contact enabling element provided on the same side of the interconnect as the bent. The contact enabling element may be in the form of a net, by pressed contact points or any other known art.

In a particular embodiment of the invention, at least part of the edges of the interconnect is bent 180° one time, which provides an interconnect and spacer with a thickness equal to or less than 2 times the thickness of the plate T.

When bent, the integrated interconnect and spacer may form at least one flow distributor for manifolding i.e. for the in- and outflow of process gasses to the stack, both from a part of the edge of the interconnect which is referred to as external manifolding and from channels located inside the interconnect area, which is referred to as internal manifolding. The edges to be bent may be formed and have gaps which allows process gas to flow into the stack, and the flow path may be oriented by the shape of the edges forming a flow distributor. The edges may for instance be formed as pins, wedges or any other shape adapted to allow for process fluid and guiding. This may be used both for internal manifolding as well as external manifolding as known in the art.

Also, the spacer may be at least partly formed by a contiguous fluid tight edge. The fluid tight edge may be adapted to form a fluid tight seal towards an external manifold or around an internal manifold. Apart from the fold itself, the spacer may be further connected to the interconnect by diffusion bonding (wherein the atoms of two solid, metallic surfaces intersperse themselves over time), welding or any other suitable connecting technique on at least a part of the edge or surface of the spacer.

In an embodiment of the invention, the bend is facilitated and guided by grooves on one, the other, or both sides of the interconnect in at least a part of the bending lines. Grooves may be present on at least one side of the interconnect to form flow fields for process fluid. Said grooves may be formed by for instance etching.

In a particular embodiment of the invention, the stack is a Solid Oxide Electrolysis Cell stack with operating temperatures as mentioned above. In a further embodiment of the invention, the stack is a Solid Oxide Fuel Cell stack. The sheet metal used to manufacture the integrated interconnect and spacer may be austenitic steel, ferritic steel or any alloy best suited for the stack.

In an embodiment of the invention, the above described Solid Oxide Cell stack is manufactured by steps comprising providing a piece of plate with the thickness T and a larger are than the area of the interconnect layer. At least a part of the edge of the plate is the bent 180° a number, N, of times to form the spacer. The spacer and interconnect together form an edge of at least a part of the integrated interconnect and spacer from this one piece of plate, with a thickness equal to or less than (1+N) times the thickness of the plate T.

In a specific embodiment, the plate is bent one time, hence the spacer and interconnect together form an edge of at least a part of the integrated interconnect and spacer with a thickness equal to or less than two times the thickness T of the plate. A further step may involve a calibration of the thickness of the integrated interconnect and spacer, which can minimize the tolerances even further than the (double) tolerances of the plate itself. This is done by performing a press of the integrated interconnect and spacer to a predefined stop, which is set below the (1+N) times T. The press force is set higher than the plastic deformation (permanent distortion that occurs when a material is subjected to e.g. compressive stresses that exceed its yield strength and cause it to e.g. compress) force of the integrated interconnect and spacer.

Features of the Invention

1. Solid Oxide Cell stack comprising a plurality of stacked cell units, each cell unit comprises a cell layer and an interconnect layer, one interconnect layer separates one cell layer from the adjacent cell layer in the cell stack, wherein the interconnect layer comprises an integrated interconnect and spacer made from one piece of plate with the thickness, T, the spacer is formed by at least a part of the edges of the interconnect which is bent 180° a number, N, of times to provide a spacer covering at least a part of the edges of the interconnect so said spacer and interconnect together forms an edge of at least a part of the integrated interconnect and spacer with a thickness equal to or less than (1+N) times the thickness of the plate T.

2. Solid Oxide Cell stack according to feature 1, wherein the at least part of the edges of the interconnect is bent 180° one time to provide a spacer covering at least a part of the edges of the interconnect so said spacer and interconnect together forms an edge of at least a part of the integrated interconnect and spacer with a thickness equal to or less than 2 times the thickness of the plate T.

3. Solid Oxide Cell stack according to any of the preceding features, wherein the spacer of the integrated interconnect and spacer further forms at least one flow distributor for manifolding.

4. Solid Oxide Cell stack according to any of the preceding features, wherein the spacer of the integrated interconnect and spacer further forms at least one flow distributor adapted for external manifolding.

5. Solid Oxide Cell stack according to any of the preceding features, wherein the spacer of the integrated interconnect and spacer further forms at least one flow distributor adapted for internal manifolding.

6. Solid Oxide Cell stack according to any of the preceding features, wherein the spacer of the integrated interconnect and spacer is at least partly formed by pins.

7. Solid Oxide Cell stack according to any of the preceding features, wherein the spacer of the integrated interconnect and spacer is at least partly formed by pins formed as wedges which are flow guides for a process fluid flow.

8. Solid Oxide Cell stack according to any of the preceding features, wherein the spacer of the integrated interconnect and spacer is at least partly formed by a contiguous fluid tight edge.

9. Solid Oxide Cell stack according to any of the preceding features, wherein the spacer of the integrated interconnect and spacer is at least partly formed by a contiguous fluid tight edge adapted to form a fluid tight seal towards an external manifold.

10. Solid Oxide Cell stack according to any of the preceding features, wherein the spacer of the integrated interconnect and spacer is at least partly formed by a contiguous fluid tight edge adapted to form a fluid tight seal around an internal manifold.

11. Solid Oxide Cell stack according to any of the preceding features, wherein the spacer is connected to the interconnect not only by the bent part, but also on at least one further edge or on the surface of the spacer facing the interconnect.

12. Solid Oxide Cell stack according to any of the preceding features, wherein the spacer is connected to the interconnect by diffusion bonding on at least a part of the surface of the spacer facing the interconnect.

13. Solid Oxide Cell stack according to any of the preceding features, wherein the spacer is connected to the interconnect by welding on at least a part of the surface of the spacer facing the interconnect.

14. Solid Oxide Cell stack according to any of the preceding features, wherein the interconnect has grooves on at least one side adapted to facilitate and guide said 180° bend.

15. Solid Oxide Cell stack according to any of the preceding features, wherein the interconnect has grooves on at least one side adapted to form flow fields for process fluid.

16. Solid Oxide Cell stack according to any of the preceding features, wherein the interconnect has grooves formed by etching on at least one side to form flow fields for process fluid.

17. Solid Oxide Cell stack according to any of the preceding features, wherein the Solid Oxide Cell stack is a Solid Oxide Electrolysis Cell stack.

18. Method for manufacturing a Solid Oxide Cell stack according to any of the preceding features, comprising a plurality of stacked cell units, each cell unit comprises a cell layer and an interconnect layer, one interconnect layer separates one cell layer from the adjacent cell layer in the cell stack, wherein the interconnect layer comprises an integrated interconnect and spacer made from one piece of plate, comprising the steps of, providing one piece of plate with the thickness T and a larger area than the area of the interconnect layer bending at least a part of the edge of said plate 180° a number, N, of times to form said spacer, so said spacer and interconnect together forms an edge of at least a part of the integrated interconnect and spacer with a thickness equal to or less than (1+N) times the thickness of the plate T.

19. Method according to feature 18, wherein the at least part of the edge of said plate is bend one time, so said spacer and interconnect together forms an edge of at least a part of the integrated interconnect and spacer with a thickness equal to or less than two times the thickness T of the plate.

20. Method for manufacturing a Solid Oxide Cell stack according to feature 18 or 19, further comprising the step of, performing a calibration press to a predefined stop with a force higher than the plastic deformation force on the integrated interconnect and spacer to ensure an even thickness of the edge of the integrated interconnect and spacer.

21. Method for manufacturing a Solid Oxide Cell stack according to any of the features 18-20, further comprising the step of, performing a calibration press to a predefined stop with a force higher than the plastic deformation force on the integrated interconnect and spacer to ensure an even thickness of the edge of the integrated interconnect and spacer which is less than (1+N) times the thickness T.

22. Method for manufacturing a Solid Oxide Cell stack according to any of the features 18-21, further comprising the foregoing step of, providing grooves on at least one side of said plate adapted to facilitate and guide said 180° bend.

23. Method for manufacturing a Solid Oxide Cell stack according to feature 22, wherein said grooves are formed by etching.

24. Method for manufacturing a Solid Oxide Cell stack according to any of the features 18-23, further comprising the step of, etching at least one side of the integrated interconnect and spacer, before or after the bending, to form flow fields for process fluid.

25. Method for manufacturing a Solid Oxide Cell stack according to any of the features 18-24, further comprising the step of diffusion bonding the spacer to the interconnect on at least a part of the surface of the spacer facing the interconnect.

26. Method for manufacturing a Solid Oxide Cell stack according to any of the features 18-25, further comprising the step of welding the spacer to the interconnect on at least a part of the surface of the spacer facing the interconnect.

BRIEF DESCRIPTION OF THE DRAWINGS

The invention is further illustrated by the accompanying drawings showing examples of embodiments of the invention.

POSITION NUMBERS

1. Integrated interconnect and spacer
2. Spacer
3. Flow distributor adapted for external manifolding
4. Flow distributor adapted for internal manifolding
5. Pins
6. Contiguous fluid tight edge

DETAILED DESCRIPTION

Figure 1:
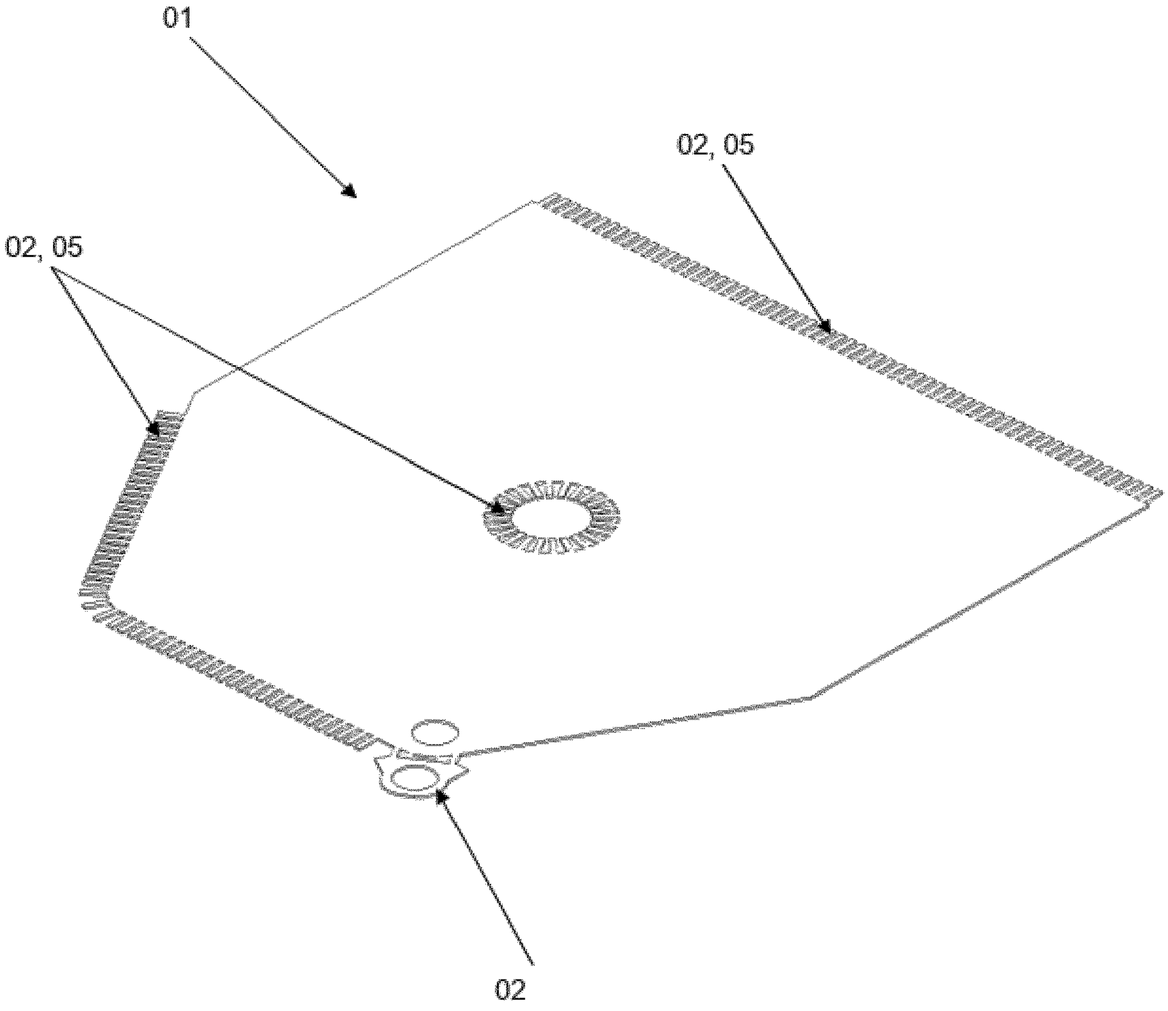
FIG. 1 shows an isometric top view of an integrated interconnect and spacer before folding.

FIG. 1 shows an integrated interconnect and spacer 01 for a Solid Oxide Cell stack (not shown). FIG. 1 shows the interconnect as one flat piece of sheet metal with surplus material adapted to form the spacers 02, but before the folding, hence the spacers have not yet been formed. The shape of the integrated interconnect and spacer with six edges is only chosen as an example. As can be seen, a part of the spacer is in the form of pins 05, which will be explained in more detail in the following.

Figure 2:
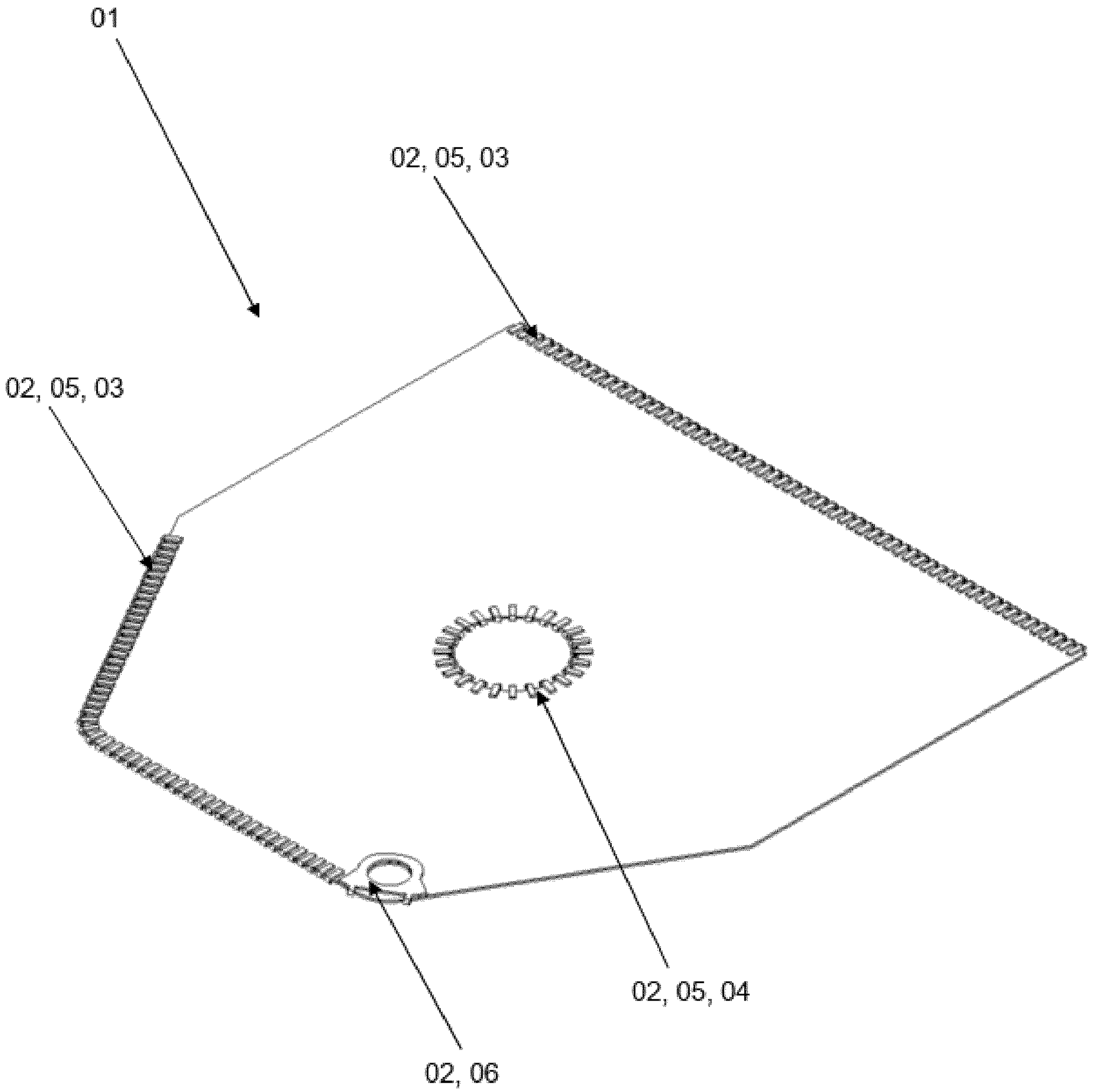
FIG. 2 shows an isometric top view of the integrated interconnect and spacer of FIG. 1 but with the spacer (surplus) part of the interconnect now folded on top of the interconnect.
Figure 3:
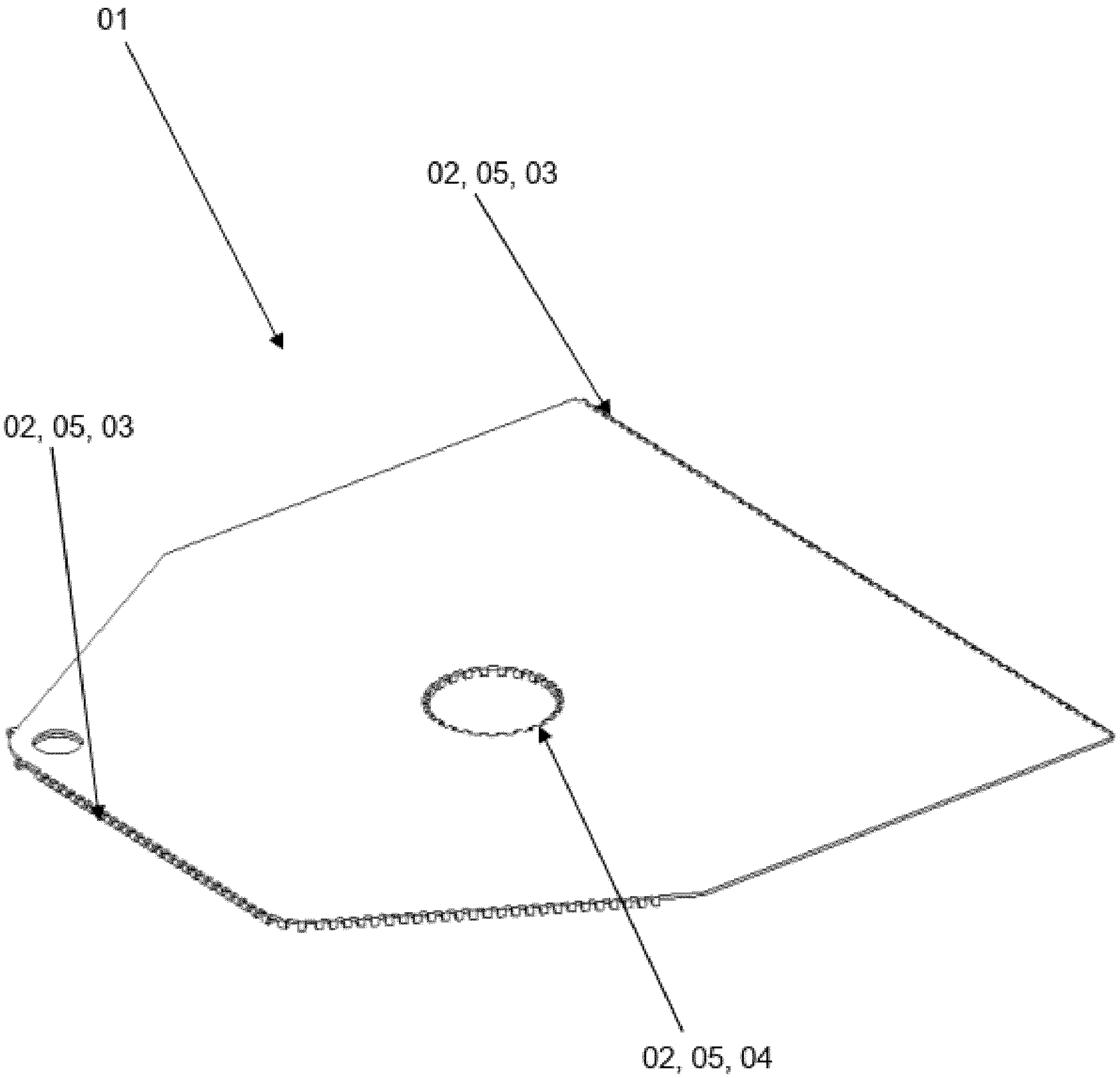
FIG. 3 shows an isometric bottom view of the integrated interconnect and spacer of FIG. 2.

On FIG. 2, the surplus material of the interconnect shown in FIG. 1 has now been folded 180° onto the top side of the interconnect to form spacers around three edges of the interconnect as well as around two through-holes cut in the interconnect. Along the three edges as well as around the centre through-hole of the interconnect, the spacers are formed as pins to allow for process gas to flow in-between the spacer pins. Hence, along the three edges, the pin formed spacers form flow distributors adapted for external manifolding 03; whereas around the centre through-hole of the interconnect the pin formed spacers forms a flow distributor adapted for internal manifolding 04. It is to be understood that the spacers adapted for manifolding may be formed in different shapes to control and direct the product gas flow to, along and from the interconnect. One spacer in FIG. 2 is formed with a contiguous fluid tight edge 06, which when folded forms an edge around the through-hole in the periphery of the interconnect, which thereby serves as a product gas channel internally in the stack. FIG. 3 shows the same folded integrated interconnect and spacer as seen in FIG. 2, only seen from the opposite (bottom) side of the interconnect.

Figure 4:
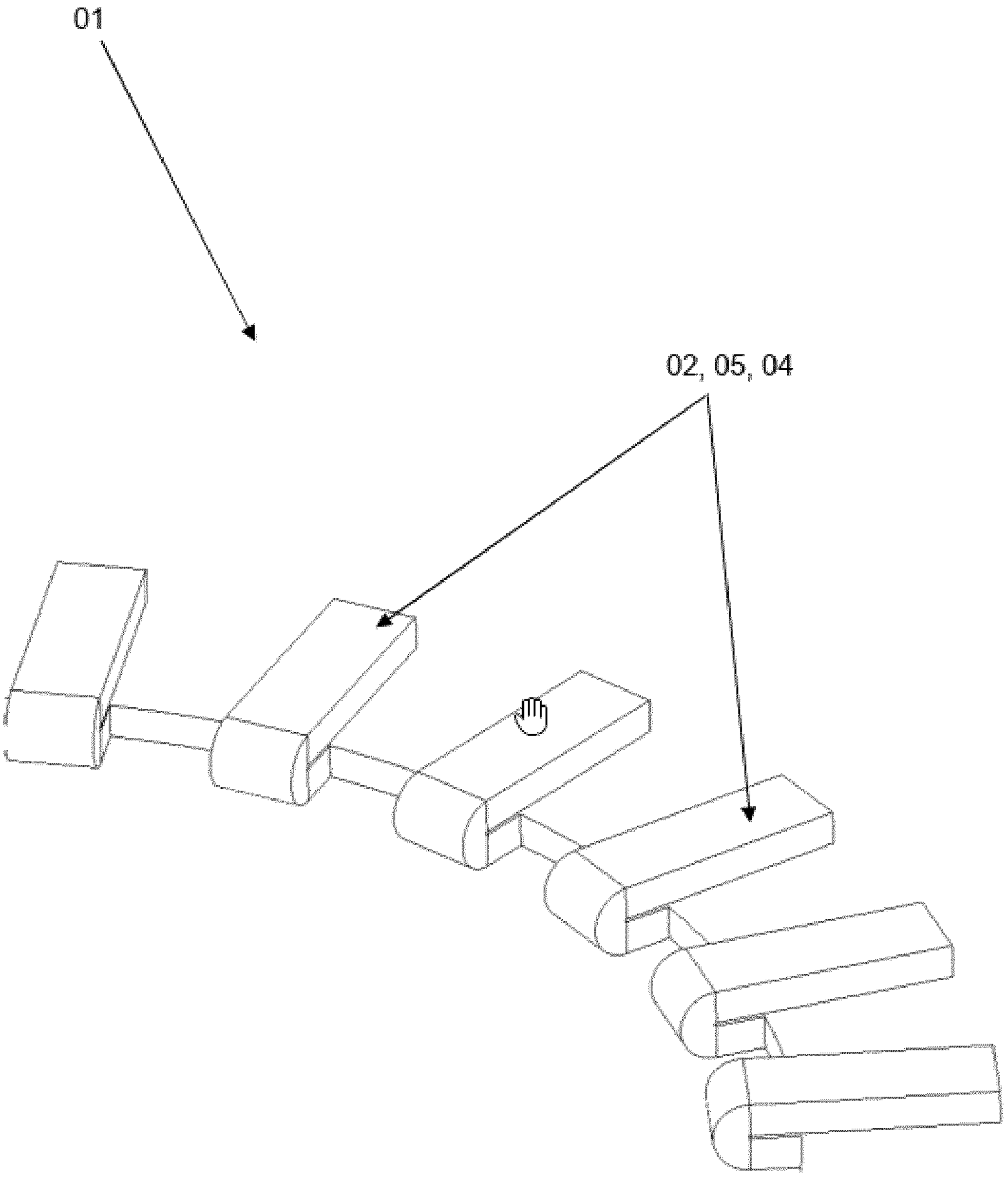
FIG. 4 shows an enlarged isometric top view of the centre part of the integrated interconnect and spacer of FIG. 2.

The folded pins acting as a flow distributor adapted for internal manifolding around the central through-hole of the interconnect is seen in more detail in FIG. 4. It is to be understood, that in one embodiment (not shown) the guiding of the bent pins and the tolerances may be enhanced by grooves in the bending section of the pins on one, the other or both sides of the sheet. Also, it is to be understood that the bent spacers may have any other shapes and forms than pins, such as whole edges or wedges.

The invention claimed is:

1. Solid Oxide Cell stack comprising a plurality of stacked cell units, each cell unit comprises a cell layer and an interconnect layer, one interconnect layer separates one cell layer from the adjacent cell layer in the cell stack, wherein the interconnect layer comprises an integrated interconnect and spacer made from one piece of plate with the thickness, T, the spacer is formed by at least a part of the edges of the interconnect which is bent 180° a number, N, of times to provide a spacer covering at least a part of the edges of the interconnect, so said spacer and interconnect together form an edge of at least a part of the integrated interconnect and spacer with a thickness equal to or less than (1+N) times the thickness of the plate T, wherein the interconnect comprises a central through-hole and a periphery through-hole, and wherein the spacer of the integrated interconnect and spacer further forms at least one flow distributor around the central through-hole and a contiguous fluid tight edge around the periphery through-hole and at least one flow distributor adapted for external manifolding.

2. Solid Oxide Cell stack according to claim 1, wherein the at least part of the edges of the interconnect is bent 180° one time to provide a spacer covering at least a part of the edges of the interconnect, so said spacer and interconnect together form an edge of at least a part of the integrated interconnect and spacer with a thickness equal to or less than 2 times the thickness of the plate T.

3. Solid Oxide Cell stack according to claim 1, wherein the spacer of the integrated interconnect and spacer is at least partly formed by pins.

4. Solid Oxide Cell stack according to claim 1, wherein the spacer of the integrated interconnect and spacer is at least partly formed by pins formed as wedges which are flow guides for a process fluid flow.

5. Solid Oxide Cell stack according to claim 1, wherein the spacer is connected to the interconnect not only by the bent part, but also on at least one further edge or surface of the spacer facing the interconnect.

6. Solid Oxide Cell stack according to claim 1, wherein the spacer is connected to the interconnect by diffusion bonding on at least a part of the surface of the spacer facing the interconnect.

7. Solid Oxide Cell stack according to claim 1, wherein the spacer is connected to the interconnect by welding on at least a part of the surface of the spacer facing the interconnect.

8. Solid Oxide Cell stack according to claim 1, wherein the interconnect has grooves on at least one side adapted to facilitate and guide said 180° bend.

9. Solid Oxide Cell stack according to claim 1, wherein the interconnect has grooves on at least one side adapted to form flow fields for process fluid.

10. Solid Oxide Cell stack according to claim 1, wherein the interconnect has grooves formed by etching on at least one side to form flow fields for process fluid.

11. Solid Oxide Cell stack according to claim 1, wherein the Solid Oxide Cell stack is a Solid Oxide Electrolysis Cell stack.

12. Method for manufacturing a Solid Oxide Cell stack according to claim 1, comprising a plurality of stacked cell units, each cell unit comprises a cell layer and an interconnect layer, one interconnect layer separates one cell layer from the adjacent cell layer in the cell stack, wherein the interconnect layer comprises an integrated interconnect and spacer made from one piece of plate, comprising the steps of:

providing one piece of plate with the thickness T and a larger area than the area of the interconnect layer bending at least a part of the edge of said plate 180° a number, N, of times to form said spacer, so said spacer and interconnect together forms an edge of at least a part of the integrated interconnect and spacer with a thickness equal to or less than (1+N) times the thickness of the plate T, wherein the interconnect comprises a central through-hole and a periphery through-hole, and wherein the spacer of the integrated interconnect and spacer further forms at least one flow distributor around the central through-hole and a contiguous fluid tight edge around the periphery through-hole and at least one flow distributor adapted for external manifolding.

13. Method according to claim 12, wherein the at least part of the edge of said plate is bent one time, so said spacer and interconnect together forms an edge of at least a part of the integrated interconnect and spacer with a thickness equal to or less than two times the thickness T of the plate.

14. Method for manufacturing a Solid Oxide Cell stack according to claim 12, further comprising the step of performing a calibration press to a predefined stop with a force higher than the plastic deformation force on the integrated interconnect and spacer to ensure an even thickness of the edge of the integrated interconnect and spacer.

15. Method for manufacturing a Solid Oxide Cell stack according to claim 12, further comprising the step of performing a calibration press to a predefined stop with a force higher than the plastic deformation force on the integrated interconnect and spacer to ensure an even thickness of the edge of the integrated interconnect and spacer which is less than (1+N) times the thickness T.

16. Method for manufacturing a Solid Oxide Cell stack according to claim 12, further comprising the foregoing step of providing grooves on at least one side of said plate adapted to facilitate and guide said 180° bend.

17. Method for manufacturing a Solid Oxide Cell stack according to claim 16, wherein said grooves are formed by etching.

18. Method for manufacturing a Solid Oxide Cell stack according to claim 12, further comprising the step of etching at least one side of the integrated interconnect and spacer, before or after the bending, to form flow fields for process fluid.

19. Method for manufacturing a Solid Oxide Cell stack according to claim 12, further comprising the step of diffusion bonding the spacer to the interconnect on at least a part of the surface of the spacer facing the interconnect.

20. Method for manufacturing a Solid Oxide Cell stack according to claim 12, further comprising the step of welding the spacer to the interconnect on at least a part of the surface of the spacer facing the interconnect.

* * * * *